July 24, 1923.

J. W. GREEN

FUEL SAVER

Filed March 27, 1922

1,462,503

INVENTOR.
J. W. Green.

By Lacy & Lacy, Atty's.

Patented July 24, 1923.

1,462,503

UNITED STATES PATENT OFFICE.

JOHN W. GREEN, OF COLUMBUS, OHIO.

FUEL SAVER.

Application filed March 27, 1922. Serial No. 546,896.

*To all whom it may concern:*

Be it known that I, JOHN W. GREEN, a citizen of the United States, residing at Columbus, in the county of Franklin and State of Ohio, have invented certain new and useful Improvements in Fuel Savers, of which the following is a specification.

My invention relates to a device forming an accessory to a kitchen range or a hot plate and the main object of the invention is to provide a device for saving fuel and more particularly gas.

With this object in view I construct my fuel saver so that it will conduct the gas from the burners upward and to prevent all escape thereof in side direction.

Furthermore I construct the device, so as to limit the air admission to what is needed for proper combustion and so that no cold air can come near the flame or the bottom of a cooking utensil placed over the burner.

The device is built in different sizes, so as to be suitable for the smallest pans as well as the largest water tanks.

Although the fuel saver is intended mainly for gas ranges, it is equally well suited for saving oil and other liquid or gaseous fuels.

In the accompanying drawing one embodiment of the invention is illustrated; and

Figure 2:
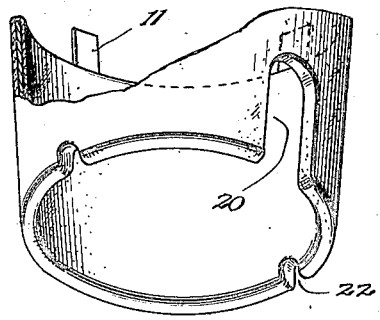
Figure 2 is a fragmentary perspective view of the gas saver.

The gas saver consists of a casing 10 preferably made of thin plate and in the shape of an inverted conic frustum and is provided at its upper edge with a number of fingers 11. A skeleton frame 12 preferably circular and adapted to fit the apertures provided in the top 13 of a gas range 14 has an inner ring 15 around which the fingers 11 are bent to provide a very rigid and secure connection between the frame 12 and the casing 10. The frame 12 has preferably a number of radial ribs 16 for supporting cooking utensils.

The inner and outer surfaces of the casing 10 have asbestos lining 18 which is intended to preserve the heat and prevent all radiation from the casing.

The casing is of such a size that it fits very closely over a gas burner 19 in order that no air but what is admitted from the bottom of the casing will pass the burner. The casing is preferably provided with an opening 20 in order that it may ride comfortably over a gas pipe 21 admitting the gas to the burner 19.

Figure 1:
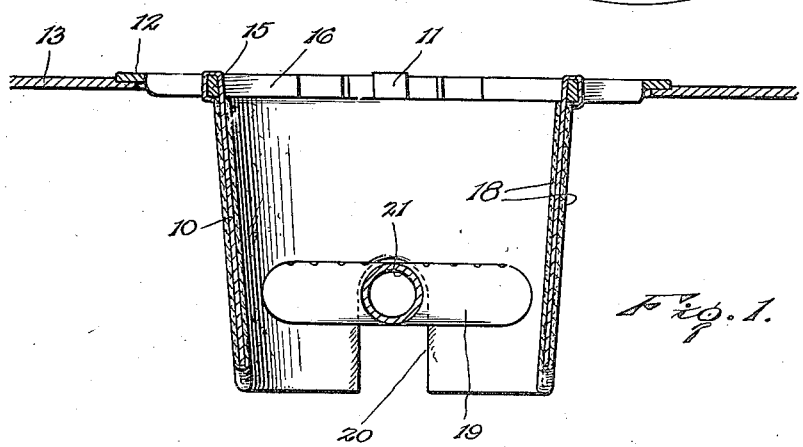
Figure 1 shows a transverse section of the fuel saver suspended from the top of a gas range.
Figure 3:
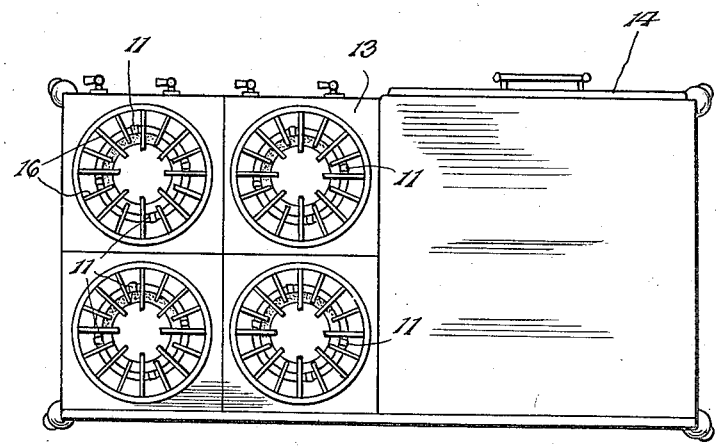
Figure 3 is a top plan view of a gas range with my device attached.

As will be evident from Figure 1, the casing extends sufficiently far below the burner 19 to prevent all loss of heat in that direction and the upper opening of the casing is substantially of the size of the bottom of the cooking utensil for which it is intended so that no cool air is admitted under the bottom thereof and only sufficient quantity of air for the proper combustion of the fuel admitted from the bottom of the casing.

In some cases it might be necessary to provide a number of indentations 22 in the lower edge of the casing, to accommodate pipes or bars near the burner.

Having thus described the invention, what is claimed as new is:

A fuel saver for burners of stoves comprising a thin metallic casing in the shape of a hollow inverted conic frustum, gripping fingers rising from the upper edge of the casing to pass over and around a skeleton frame in the top of a stove, both the inner and outer sides of said casing being covered with refractory material, said casing adapted to enclose a fuel burner so that its lower end extends below the burner and its upper edge is disposed close to the skeleton frame, the lower edge of the casing being provided with an opening to span the burner supply pipe, and notches to accommodate elements of the stove structure.

In testimony whereof I affix my signature.

JOHN W. GREEN